United States Patent Office 3,409,271
Patented Nov. 5, 1968

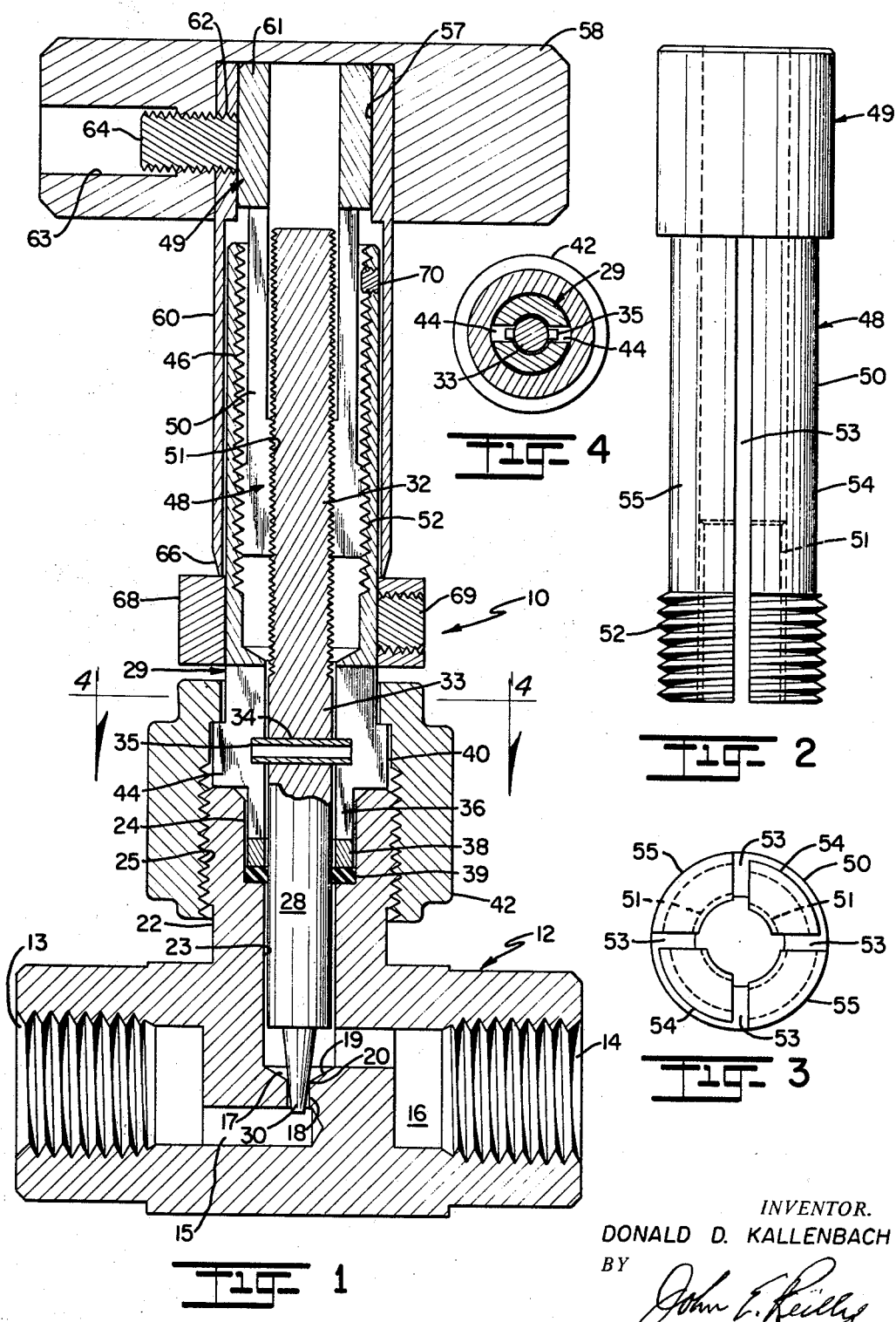

3,409,271
FLUID FLOW CONTROL VALVE
Donald D. Kallenbach, Cheyenne, Wyo., assignor to Ideal Aerosmith, Inc., Cheyenne, Wyo., a corporation of Wyoming
Filed May 4, 1966, Ser. No. 547,472
10 Claims. (Cl. 251—265)

This invention generally relates to a novel and improved control valve, and more particularly relates to a valve of the type incorporating a needle-shaped valve member which is capable of undergoing non-rotatable, linear movement toward and away from a valve seat in controlling fluid flow between inlet and outlet ports, and where in accordance with the present invention such movement is controlled in a more positive, accurate and dependable manner.

It is customary in a fluid flow control valve to employ a valve stem wherein rotational adjustment of a control member is translated into non-rotatable sliding movement of the stem to effect opening and closing of the valve. This particular manner and means of valve control is desirable in that it minimizes scoring and jamming between the valve stem and seat and affords an effective way of controlling the valve opening size. In accordance with the present invention, a control valve of the type described takes the form of a precision valve incorporating a needle-shaped valve element which is closely and accurately controlled in its linear movement over a wide range of adjustment without backlash or play between moving parts. In this way, it is possible to obtain more direct control over movement of the valve element within very close tolerances as well as to effect full closing of the valve without undue pressure being exerted by the valve element upon the valve seat, and in addition to maintain exact alignment between the valve stem and seat under repeated use and notwithstanding wear between the parts. Moreover, in a valve of the type described it is highly desirable that the foregoing be accomplished in a compact, simplified arrangement which is self-compensating for wear and requires a minimum number of parts and sealing elements.

Accordingly, it is a principal and foremost object of the foregoing invention to provide for a novel and improved control valve in which a valve element is positively and directly controllable over a wide range of adjustment without backlash or play between the controlling member and the valve element.

It is another object of the present invention to provide in a control valve for a needle-shaped slide valve element movable over a wide range of adjustment to close and accurately control within close tolerances the opening size of the valve.

It is a further object of the present invention to provide a control valve of the type described which is compact, employs a minimum number of parts and is greatly simplified in construction while being economical to manufacture and assemble; and further wherein the valve incorporates a needle-shaped valve element which is capable of undergoing linear non-rotatable movement into and away from engagement with a valve seat without exerting undue pressure on the seat in the closed position and is closely and accurately adjustable in relation to the seat over a wide range of movement.

It is a still further object of the present invention to provide in a precision control valve for a novel form of adjustment control means in effecting linear, non-rotating movement of a needle-shaped valve element and which is so constructed and arranged as to afford a more direct, close means of control in the opening size between the valve element and seat while establishing ease and accuracy in adjustment without backlash or play between the elements as well as to eliminate scoring, damage or excessive wear between the moving parts all in a novel and improved manner.

It is an additional object of the present invention to provide for a novel and improved, adjustable guide member to control linear, non-rotatable movement of a needle-shaped valve element toward and away from engagement with a valve seat while maintaining exact alignment between the valve and seat with sensitive direct response established between the guide member and valve elements in advancing the valve element into closed relation with the seat, and the foregoing being accomplished without the use of special spring elements or seals between the moving parts.

In accordance with the present invention, there has been devised a novel and improved valve incorporating an elongated needle-shaped valve member which is aligned with a valve orifice interposed between inlet and outlet ports to accurately regulate fluid flow and to control opening and closing of the valve. Movement of the valve member is controlled by an outer concentric, rotatable adjustment member which is designed in a unique manner to establish differential reverse threaded engagement between the valve casing and stem and further to bear firmly both against the casing and stem in causing linear, non-rotatable movement of the valve member toward and away from the valve seating area. Most desirably, an edge-to-surface engagement is established between the valve seat and stem in closing the valve and which is made possible by the absence of any lash or play between the guide and valve members in further combination with the use of an adjustable stop element for the guide member which will limit continued advancement of the valve member when contact is made with the valve seat. Moreover, by virtue of the relative disposition and arrangement between the rotatable guide, valve casing and stem a single seal is required in the valve. In general, therefore, the valve requires a minimum number of parts, is compact and accurately adjustable over a wide range of movement of the valve member while minimizing wear and damage between the parts.

The above and other objects, advantages and features of the present invention will become more readily understood and appreciated from a consideration of the following detailed description of a preferred form of the present invention when taken together with the accompanying drawings, in which:

FIGURE 1 is a medial sectional view through a preferred form of valve assembly in accordance with the present invention.

FIGURE 2 is an enlarged view in elevation of the preferred form of guide member for the valve shown in FIGURE 1.

FIGURE 3 is an end view of the forward end of the guide member shown in FIGURE 2; and FIGURE 4 is a sectional view taken about line 4—4 of FIGURE 1.

Referring in more detail to the drawings, there is shown by way of illustrative example a fluid flow control valve 10 which has a valve body 12 provided with oppositely directed inlet and outlet ports 13 and 14 leading into bores 15 and 16 of reduced diameter and which are in communication with one another through a valve orifice 17. The orifice is defined by annular wall surfaces 18 and 19 converging inwardly toward one another and terminating in a common annular seating edge 20. Here the orifice is disposed on an axis at right angles to the longitudinal axes of the inlet and outlet ports 13 and 14, which axis is also on the longitudinal axis of a tubular extension 22, the latter defining an integral part of the body and being formed to include a bore 23 directed inwardly from an enlarged annular recess 24 within externally threaded end portion 25.

An important feature of the present invention resides in the relative disposition and arrangement of a valve stem member 28 within an elongated cylindrical valve casing 29 which is connected to define a continuation of the tubular portion 22. It will be seen that the valve member 28 is generally needle-shaped, that is to say, is of elongated cylindrical configuration and terminates in a valve element or tip 30 which is tapered forwardly in a direction opposite to that of the wall surface 18 defining the valve orifice. Here a relatively low degree of taper is given to the wall surface 18 and to the external surface of the tip 30 whereby to enable close control over changes in capacity or rate of flow through the valve, especially in approaching the closed position, and as established by contact between the valve tip 30 and annular seating edge 20. The greater length of the valve member is of uniform diameter with the rearward section 32 being externally threaded and the forward section 33 having a smooth external surface and including a transverse slot 34 for close-fitting insertion of a cross pin 35 in spaced relation beneath the threaded section 32. In turn, the valve casing includes a forward, slotted end portion 36 of reduced diameter and being dimensioned for insertion within the annular recess 24 and into seated relation against a retainer ring 38 and O-ring 39. An enlarged external shoulder 40 on the casing abuts the end of the tubular portion 22 and an internally threaded coupling 42 is positioned in surrounding relation to the shoulder and into threaded engagement with the end of the tubular portion to firmly seat the reduced end 36 of the casing against the retainer ring 38 and to compress the O-ring 39 into sealed relation against the external surface of the valve stem. As will become more apparent the O-ring 39 defines the sole means of sealing required between the valve stem, valve casing and valve body, thus greatly simplifying the entire valve construction and facilitating its assembly.

It will be further seen that the forward end of the valve casing is of reduced internal diameter to define an axial continuation of the bore 23 and which together with the bore serves as a guide passage for the forward end section of the valve member. In this relation the forward end 36 is provided with longitudinally extending, diametrically opposed open slots 44 for the purpose of receiving opposite ends of the cross pin 35 on the valve stem whereby to prevent rotation of the valve stem as it is advanced in an axial or longitudinal direction through the casing in a manner to be described. The greater length of the casing outwardly of the end portion 36 is of increased diameter and includes a relatively thin-walled internally threaded section 46 disposed in spaced outer concentric relation to the externally threaded section 32 of the valve stem member.

In order to accurately control linear nonrotatable movement of the valve stem toward and away from the valve orifice, a guide sleeve 48 as shown in detail in FIGURES 2 and 3, is comprised of an outer connecting end portion 49 and a slotted tubular guide portion 50, the latter being dimensioned for threaded insertion through the annular space formed between the casing and stem. The tubular guide portion 50 has internal threading 51 to mate with the externally threaded section 32 of the valve stem as well as external threading 52 to mate with the internal threaded section 46 of the valve casing. Here the threading 51 and 52 on the guide sleeve is of opposite hand, or reversed, so that rotation of the sleeve 48 will cause advancement of the sleeve with respect to the valve casing while advancing the valve stem in a corresponding axial direction with respect to the guide sleeve; and since the valve stem is constrained against rotation by the cross pin 35, it will be caused to slide in an axial or longitudinal direction under the control of the guide sleeve 48. In this relation, it is highly desirable in controlling longitudinal, non-rotational sliding movement of the valve stem that the guide sleeve be capable of positively and directly translating such movement to the stem without backlash or play between the threaded surfaces. In accordance with the present invention this is accomplished by forming longitudinally extending slots 53 at circumferential spaced intervals throughout the length of the guide portion 50, as best seen from FIGURE 2, so as to divide the sleeve into a series of threaded wall sections. In the preferred form, the guide portion 50 is divided by a series of four slots 53 into four quadrantal wall portions and with two diametrically opposed wall portions 54 being bent inwardly a slight extent toward one another and the other two diametrically opposed wall portions 55 being bent outwardly a slight extent away from one another at the free ends. As illustrated in FIGURE 3, the wall portions will effectively define cantilevered arm portions laterally bent or sprung alternately in opposite directions to the extent necessary to assure firm bearing engagement between the threaded guide portion 50 of the sleeve and the outer valve casing and inner valve stem. Specifically, the inwardly bent arm portions 54 upon insertion through the annular space are biased to bear firmly against the external threaded section 32, and the outwardly bent arm portions 55 are in turn biased to bear against the internal threaded section 46 so as to eliminate any play or lash between the threaded sections in effecting linear sliding movement of the valve stem through the casing.

In order to turn the guide sleeve, the outer end portion 49 projects outwardly beyond the casing for insertion in a recess 57 formed in control knob 58. In addition, an outer movement-limiting sleeve 60 is disposed in spaced outer concentric relation to hte casing and is provided with a thickened tubular end portion 61 concentrically positioned between the wall surface of the cavity and the external surface of the end portion so as to establish close-fitting relation therebetween. It will be seen that the end portion 61 has a transverse threaded bore 62 aligned with a bore 63 in the control knob 58 to receive a set screw 64 which upon inward threading through the end portion 61 will engage the external surface of the end portion 49 and lock the guide sleeve for rotation with the control knob. Also the outer sleeve 60 is rotable with the knob 58 to follow the guide sleeve 58 in causing linear sliding movement of the valve stem member through the casing. The outer sleeve 60 is further provided with a forward, tapered extremity 66 to engage an adjustable stop collar 68 disposed on the external surface of the casing beneath the outer sleeve 60. The collar 68 includes a set screw 69 to adjustably position the collar on the casing at a location limiting the forward advancement of the outer sleeve 60, as well as the guide sleeve 48, to a point just establishing contact and closing of the valve member 30 against seating edge 20. In this way, undue tightening and excessive wear between the valve member and seat is avoided.

In order to limit outward displacement of the guide sleeve with respect to the valve casing, another set screw 70 may be positioned in the wall of the casing adjacent its outer end so as to abut the upper edge of the externally threaded section on the guide sleeve and prevent its continued outward movement through the casing.

In the preferred form it will be apparent that linear or axial sliding movement of the valve stem in response to rotation of the control knob will be determined by the relative number of teeth per inch, or pitch, of the external and internal threaded surfaces on the guide sleve. As illustrated in FIGURE 1, the pitch of the external threading 52 is less than that of the internal threaded surface 51 so that linear movement of the valve stem as controlled by the internal threading 51 will be correspondingly less for a given distance of movement of the guide sleeve with respect to the valve casing. Thus by means of the differential threading or pitch established between the valve stem and casing some mechanical advantage is afforded in advancing the valve stem and its rate of advancement is more closely controlled. Suitable markings or graduations, not shown, may be provided on the external surface of the valve casing to indicate the movement of the valve stem, and the tapered extremity 66 of the outer sleeve may serve as an indication of the stem position as the extremity becames aligned with each of the markings. Further, to lend increased accuracy and control in movement of the valve stem, the valve stem is provided with a gradual taper, as hereinbefore described, so that the rate of flow through the valve orifice will undergo very slight changes under incremental movement of the valve. Moreover, increased accuracy is afforded as the valve approaches the closed position by virtue of the line contact established between the annular seating edge 20 and the external surface of the valve element.

In assembly, the guide sleeve 48 is positioned with respect to the valve stem and casing and the collar 68 aligned relative to the outer limiting sleeve such that the forward extremity 66 will abut the upper surface of the collar 68 as the valve element contacts and establishes closed relation with the seating edge 20. Since the valve stem is constrained for non-rotable sliding movement into and away from closed relation with the valve seat, any scoring or jamming between the valve and valve seat is minimized as well as any excessive wear between the elements. Further, the stop collar cooperates in this by preventing evcessive tightening of the valve in the closed position, and accuracy and close control are maintained under repeated use by removing any play or backlash between the interengaging threaded surfaces of the guide sleeve, valve casing and stem. At the same time, the closefitting engagement between the guide sleeve and inner and outer concentric stem and casing will maintain more exact axial alignment between the valve 30 and valve orifice 17 while affording more positive and direct control over movement of the valve stem in response to rotation of the control knob.

In general, the concentric relation established between the elements enables a more compact assembly while eliminating the need for separate spring or biasing elements, and also enables the use of a single seal in the valve assembly. The parts comprising the valve described in the preferred form may be of metal composition, with the exception of the seal, and the guide sleeve is most desirably composed of stainless or spring steel with sufficient resiliency and strength to maintain the requisite lateral thrust against the valve casing and stem under repeated use.

While a preferred embodiment of the present invention has been set forth and described herein, it will be apparent that various modifications and changes may be made in the particular construction and arrangement of parts as well as in the relative proportions and dimensions thereof without departing from the spirit and scope of the present invention as defined by the appended claims.

What is claimed is:

1. A fluid flow control valve comprising in combination a valve seat and valve member being guided for longitudinal sliding movement toward and away from closing relation with said valve seat, said valve member including a threaded section thereon, a tubular casing defining a guide passage for said valve member and including a threaded section in spaced concentric relation to the threaded section on said valve member, a valve control sleeve concentrically disposed between said valve member and tubular casing and having longitudinally split threaded sections alternately biased inwardly and outwardly for close-fitting interengagement with the threaded sections on said valve member and said tubular casing whereby threaded advancement of said valve control sleeve relative to the threaded section on said tubular casing will cause longitudinal advancement of said valve member with respect to said valve seat.

2. A fluid flow control valve according to claim 1 further including means between said valve member and said tubular casing to prevent rotation of said valve member as it is advanced toward and away from said valve seat.

3. A fluid flow control valve according to claim 1, said valve control sleeve being longitudinally slotted as spaced circumferential intervals along the internally and externally threaded sections thereof to define a series of circumferentially spaced wall portions, said wall portions being sprung alternately in radial inward and outward directions so as to be alternately biased against the threaded sections on said valve member and said tubular casing, respectively.

4. A fluid flow control valve according to claim 1, further including a housing containing inlet and outlet ports and said valve seat being disposed in surrounding relation to a valve orifice between the ports, said tubular casing being disposed in an annular recess in said housing adjacent to the valve orifice, an annular seal between the end of said tubular casing and the recess, and coupling means for adjustably tightening the end of said tubular casing against said seal in order to force said seal into sealed relation with said valve member.

5. A fluid flow control valve according to claim 1, said valve seat being defined by an annular seating edge surrounding a valve orifice, and said valve member including a valve tip at one end being tapered forwardly in a direction toward the valve orifice for selective advancement into contacting relation with the annular seating edge.

6. A fluid flow control valve according to claim 3, further including means to define the opposite end limits of movement of said valve member under longitudinal advancement toward and away from said valve seat, said means including a stop member disposed to limit continued forward advancement of said valve member when said valve member is advanced to a position establishing contact with said valve seat.

7. In a valve, a valve body including a valve seat disposed between inlet and outlet ports therein, a valve stem movable into and out of closing relation with said valve seat, said valve stem including an externally threaded section thereon, a valve casing for said valve stem having an internally threaded section in outer spaced concentric relation to the threaded section on said valve stem, and a valve control sleeve having an internally and externally threaded wall section concentrically disposed between said valve stem and valve casing, said threaded wall section being divided at spaced circumferential intervals by longitudinally extending open slots into arcuate wall portions, said wall portions being sprung alternately in radial inward and outward directions against the threaded sections on said valve stem and valve casing, respectively.

8. In a valve according to claim 9, said valve control sleeve including an outwardly projecting connecting end portion, a control knob engaging said connecting end portion for rotaiton of said valve control sleeve, an outer movement-limiting sleeve being rotatable with said control sleeve in outer concentric relation to said valve casing, and an adjustable stop member on said valve casing engageable with said sleeve when said valve control sleeve is advanced to a position establishing contact between said valve stem and valve seat in the closed position.

9. In a valve according to claim 7, said valve casing being adjustably connected in sealed relation at one end to said valve body whereby to define a guide passage for sliding movement of said valve stem toward and away from said valve seat, and means associated with said valve casing to define the limits of movement of said valve stem into and out of closing relation with said valve seat.

10. In a valve, a valve seat being defined by an annular seating edge at the intersection of inwardly tapered, oppositely directed, conical wall surfaces forming a valve orifice, a needle-shaped valve member being axially aligned with the valve orifice and including a valve tip at one end thereof being tapered forwardly in a direction toward the valve orifice, said valve tip being dimensioned for axial advancement through the valve orifice into and out of contacting relation to the annular seating edge, an outer valve casing for said valve member, and valve control means being concentrically disposed between said valve member and valve casing, said valve control means being movable to impart longitudinal, non-rotatable sliding advancement to said valve member in a direction toward and away from the valve seat, being further characterized by establishing reverse, differential threaded engagement with said valve member and including a laterally projecting element slidable in a longitudinal slot formed in the valve casing, and further including an internally and externally threaded wall section being divided at spaced circumferential intervals into cantilevered segmental wall portions alternately biased radially inwardly and outwardly into engagement with threaded sections on said valve member and said valve casing, respectively.

References Cited

UNITED STATES PATENTS

| | | | |
|---|---|---|---|
| 633,217 | 9/1899 | Qurin | 251—265 |
| 2,784,934 | 3/1957 | Paulius et al. | 251—265 |
| 3,027,134 | 3/1962 | Nichols | 251—333 X |

WILLIAM F. O'DEA, *Primary Examiner.*

D. R. MATTHEWS, *Assistant Examiner.*